(12) United States Patent
Heuer et al.

(10) Patent No.: US 12,208,407 B2
(45) Date of Patent: Jan. 28, 2025

(54) ALIGNMENT TOOL FOR A SPRAY GUN AIR CAP

(71) Applicant: Graco Minnesota Inc., Minneapolis, MN (US)

(72) Inventors: William C. Heuer, Minnetonka, MN (US); Christopher C. Wagner, Saint Anthony, MN (US); Amelia J. Stech, St Paul, MN (US); Dawn P. Svenkeson-Koubal, Wayzata, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 727 days.

(21) Appl. No.: 17/302,434

(22) Filed: May 3, 2021

(65) Prior Publication Data
US 2022/0282963 A1    Sep. 8, 2022

Related U.S. Application Data

(60) Provisional application No. 63/157,222, filed on Mar. 5, 2021.

(51) Int. Cl.
| | |
|---|---|
| *B05B 15/68* | (2018.01) |
| *B05B 1/04* | (2006.01) |
| *G01B 5/25* | (2006.01) |

(52) U.S. Cl.
CPC .............. *B05B 15/68* (2018.02); *B05B 1/04* (2013.01); *G01B 5/25* (2013.01)

(58) Field of Classification Search
CPC .. G01B 5/25; B05B 15/68; B05B 1/04; B05B 7/0815; B05B 7/025; B05B 7/2408;
(Continued)

(56) References Cited

U.S. PATENT DOCUMENTS

| 4,533,005 A | 8/1985 | Morris |
|---|---|---|
| 5,639,025 A | 6/1997 | Bush |

(Continued)

FOREIGN PATENT DOCUMENTS

| CN | 2746363 Y | 12/2005 |
|---|---|---|
| CN | 102917803 A | 2/2013 |

(Continued)

OTHER PUBLICATIONS

Extended European Search Report for EP Application No. 22159054.0, dated Aug. 8, 2022, 8 pages.
(Continued)

*Primary Examiner* — Christopher R Dandridge
(74) *Attorney, Agent, or Firm* — Kinney & Lange, P. A.

(57) ABSTRACT

An alignment tool for engaging with an air cap of an air assisted airless spray gun includes a tool body configured to fit over the air cap and an indicator disposed on the tool body. The indicator is configured to indicate an angular position of the air cap relative to a vertical gun axis of the air assisted airless spray gun. The alignment tool includes a first surface configured to engage with a first air horn of the air cap and a second surface configured to engage with a second air horn of the air cap to exert a rotational force on the air cap and change the angular position of the air cap relative to the vertical gun axis.

14 Claims, 8 Drawing Sheets

(58) Field of Classification Search
CPC ....... B05B 7/066; B05B 1/042; B05B 1/3033; B05B 12/36
See application file for complete search history.

(56) References Cited

U.S. PATENT DOCUMENTS

| | | | |
|---|---|---|---|
| 5,941,463 A | 8/1999 | Herstek et al. | |
| 6,036,109 A | 3/2000 | Deyoung | |
| 6,267,302 B1 | 7/2001 | Huffman | |
| 6,460,787 B1 | 10/2002 | Hartle et al. | |
| 6,568,097 B2 | 5/2003 | Eckard | |
| 6,854,667 B2 | 2/2005 | Ulrich et al. | |
| 6,860,438 B1 | 3/2005 | Huang | |
| 6,978,944 B1 | 12/2005 | Carey et al. | |
| 7,040,546 B2 | 5/2006 | Horan et al. | |
| 7,458,524 B2 | 12/2008 | Prieto et al. | |
| 9,421,562 B2 * | 8/2016 | Krayer | B05B 7/0475 |
| 9,802,211 B2 | 10/2017 | Joseph et al. | |
| 9,802,213 B2 * | 10/2017 | Joseph | B05B 7/2432 |
| 9,914,144 B2 | 3/2018 | Kosovich et al. | |
| 10,456,795 B2 | 10/2019 | Wen | |
| 11,229,921 B2 | 1/2022 | Haislet et al. | |
| 2005/0242207 A1 | 11/2005 | Tejeda | |
| 2010/0224700 A1 | 9/2010 | Woodgate et al. | |
| 2016/0175870 A1 | 6/2016 | Aporta et al. | |
| 2017/0120269 A1 | 5/2017 | Scheibner et al. | |
| 2018/0071758 A1 | 3/2018 | Hata | |
| 2018/0236471 A1 | 8/2018 | Sulzer et al. | |
| 2019/0143345 A1 | 5/2019 | Hasday et al. | |
| 2019/0337007 A1 | 11/2019 | Haislet et al. | |
| 2021/0394208 A1 | 12/2021 | Wagner et al. | |
| 2022/0282963 A1 | 9/2022 | Heuer et al. | |

FOREIGN PATENT DOCUMENTS

| | | |
|---|---|---|
| CN | 103501918 A | 1/2014 |
| CN | 105964438 A | 9/2016 |
| CN | 108452966 A | 8/2018 |
| CN | 210754139 U | 6/2020 |
| DE | 69121193 | 9/1996 |
| DE | 69121193 T2 | 9/1996 |
| DE | 212016000027 U1 | 6/2017 |
| EP | 2461909 B1 | 1/2015 |
| EP | 2704850 B1 | 11/2017 |
| GB | 175785 A | 3/1922 |
| GB | 1136577 A | 12/1968 |
| JP | H09253538 A | 9/1997 |
| JP | 2006218451 A | 8/2006 |
| JP | 2006326452 A | 12/2006 |
| JP | 2007144271 A | 6/2007 |
| WO | 2018157066 A1 | 8/2018 |

OTHER PUBLICATIONS

Second Chinese Office Action for CN Application No. 202210189873. 6, Dated Oct. 13, 2023, pp. 5.
First Chinese Office Action for CN Application No. 202210189873. 6, Dated Apr. 6, 2023, pp. 21.
Third Chinese Office Action for CN Application No. 202210189873. 6, Dated Nov. 24, 2023, pp. 4.

* cited by examiner

ALIGNMENT TOOL FOR A SPRAY GUN AIR CAP

CROSS-REFERENCE TO RELATED APPLICATION(S)

This application claims the benefit of U.S. Provisional Application No. 63/157,222 filed Mar. 5, 2021 for "ALIGNMENT TOOL FOR A SPRAY GUN AIR CAP," the disclosure of which is hereby incorporated by reference in its entirety.

BACKGROUND

The present disclosure relates generally to air assisted airless guns for spraying paint and other coatings. In particular, the present disclosure relates to an alignment tool for an air assisted airless gun.

Every time the tip or retaining ring assembly is removed, such as for cleaning, replacement, or other maintenance, the operator needs to re-align the tip. The alignment of the tip on an air assisted airless gun is a cumbersome process requiring multiple adjustments and rotations to facilitate proper alignment. The alignment can require multiple spray iterations to test the alignment to ensure that the tip is properly aligned. Precise orientation and alignment of the tip can be difficult for a variety of reasons. In particular, this is due to the fact that there are no reliable ways to indicate where the tip is orientated without performing a spray test.

SUMMARY

According to one aspect of the disclosure, an alignment tool for adjusting an orientation of a spray pattern emitted by an air assisted airless spray gun includes a tool body extending between a first end and a second end, a first engagement surface disposed at the first end which at least partially defines a first opening configured to receive a first air horn of an air cap of the spray gun, and a second engagement surface disposed at the first end which at least partially defines a second opening configured to receive a second air horn of the air cap. The first engagement surface is configured to interface with the first air horn and the second engagement surface is configured to interface with the second air horn to exert a rotational force on the air cap about a spray axis through the air cap.

According to another aspect of the disclosure, an alignment system includes an air assisted airless spray gun configured to generate a fluid spray and an alignment tool. The air assisted airless spray gun includes a gun body and an air cap assembly mounted to the gun body which is configured to emit a fluid spray fan from a spray orifice and at a fan orientation. The air cap assembly includes an air cap having a first air horn extending axially from the air cap and spaced radially from the spray orifice and a second air horn extending axially from the air cap and spaced radially from the spray orifice, and an air cap housing connected to the gun body to secure the air cap to the gun body. The alignment tool is configured to extend over the air cap and engage with the first air horn and the second air horn to exert a rotational force on the air cap by the engagement between the alignment tool and the first air horn and second air horn to alter an angular position of the air cap and thereby alter the fan orientation.

According to another aspect of the disclosure, a method of adjusting an angular orientation of a spray pattern emitted by an air assisted airless spray gun includes connecting the air cap and a spray tip to the air assisted airless spray gun by an air cap housing extending over the air cap and engaging a gun body of the air assisted airless spray gun, engaging a first air horn of the air cap with an alignment tool, rotating the alignment tool about a spray axis to exert a rotational force on the air cap by the engagement between the first air horn and the alignment tool, and aligning an indicator formed on one of the alignment tool and the spray gun with one of a series of indicia formed on the other one of the alignment tool and the spray gun thereby orienting the spray tip to emit a spray fan at a desired fan orientation.

The present summary is provided only by way of example, and not limitation. Other aspects of the present disclosure will be appreciated in view of the entirety of the present disclosure, including the entire text, claims, and accompanying figures.

Figure 1A:
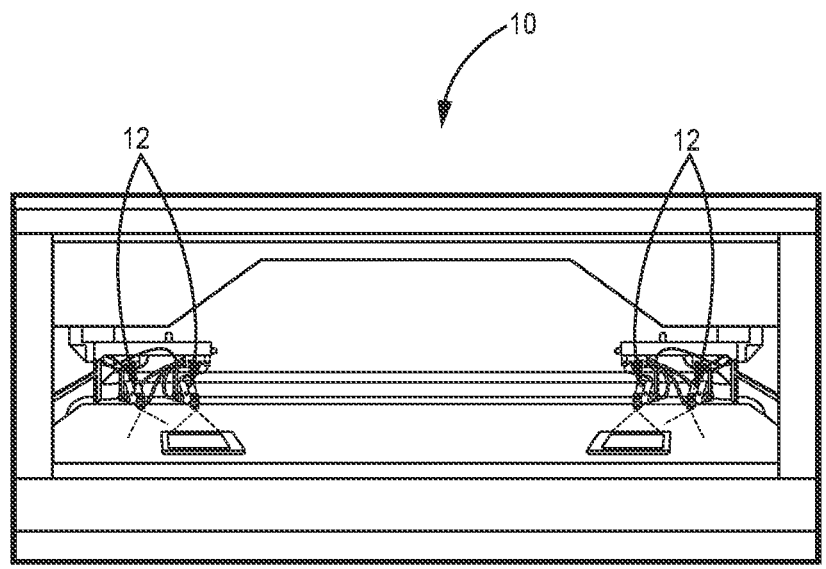
FIG. 1A is a perspective view of a spray machine containing multiple air assisted airless spray guns.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

The alignment tool of the present disclosure incorporates an indicator and a series of indicia and can interact with the air cap of a spray gun, such as an air assisted airless (AA) spray gun. The alignment tool can indicate the rotational position of the air cap horns and can have a feature which aligns with position demarcations. For example, the alignment tool can interface with the air cap of an AA spray gun to adjust the angle of the spray fan emitted by such a spray gun. An alignment tool with these corresponding position demarcations can allow the operator to easily and accurately align the air cap to a desired orientation.

Figure 1B:
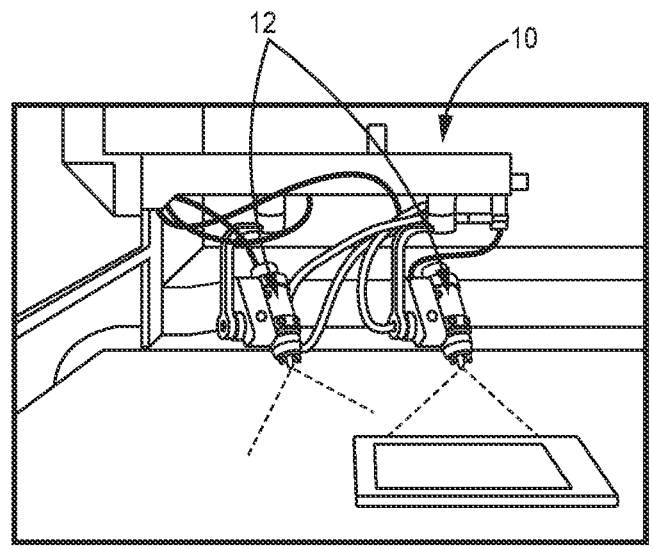
FIG. 1B is a perspective view of an air assisted airless spray gun assembly from FIG. 1A.

FIG. 1A is a perspective view of a spray machine 10 containing multiple spray guns 12. FIG. 1B is a perspective view of spray guns 12 spraying a surface. FIGS. 1A and 1B will be discussed concurrently. A fluid spraying machine, such as the spray machine 10 depicted in FIG. 1A, can have multiple spray guns 12, and each spray gun 12 can have a varied spray tip orientation to maximize uniformity of coverage and minimize product waste. Poor spray tip alignment can cause finishing defects such as haloing, which can require a sprayed surface to be sent through the spray machine 10 multiple times in order to achieve the desired coverage. Alignment tool 14 (discussed below and best seen in FIGS. 4A-4B) facilitates quick and efficient alignment of each spray tip, providing user confidence and reducing downtime by ensuring that all spray tips are properly aligned.

Figure 2:
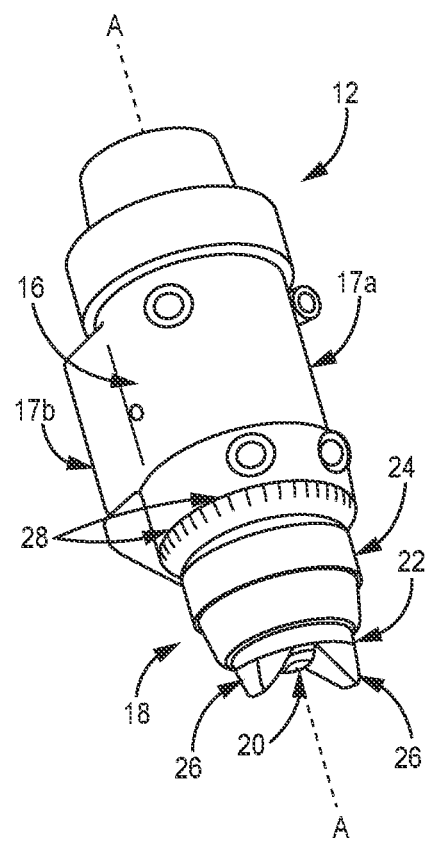
FIG. 2 is an isometric view of an air assisted airless spray gun.

FIG. 2 is an isometric view of spray gun 12. Spray gun 12 includes gun body 16, air cap assembly 18, and indicia 28. Air cap assembly 18 includes spray tip 20, air cap 22 and air cap housing 24. In the example shown, air cap 22 includes air horns 26. Air cap housing 24 can secure air cap 22 to gun body 16.

In the example shown, spray gun 12 is an automatic AA spray gun in that spray gun 12 can be operated automatically by a machine rather than directly by the user. It is understood that, in some examples, spray gun 12 can be a manual AA spray gun configured to be operated by a user. For example, spray gun 12 can include a handle configured to be grasped by the user and a trigger configured to be manipulated by the user to cause spraying by spray gun 12.

Gun body 16 is configured to receive flows of spray fluid and air. Gun body 16 supports other components of spray gun 12. Gun body 16 includes first side 17a and second side 17b. In the example shown, second side 17b is a flat and can form a mounting side of spray gun 12. For example, second side 17b can be mounted to a support, such as a support of the spray machine 10. First side 17a can be considered to be the top side and second side 17b can be considered to be the bottom side. In some examples, second side 17b is mounted to a support, such as a spray arm of a spray machine 10, such that second side 17b can be considered to be a support side of gun body 16. For example, a fastener, such as a bolt, screw, clasp, or other suitable fastener, can connect gun body 16 to the support.

Spray gun 12 is configured to emit an atomized spray of the spray fluid for application to a substrate. The spray fluid is emitted through a spray tip as the atomized fluid spray. Pressurized air is emitted through air cap 22 and is configured to interact with the atomized fluid spray to shape the pattern emitted from spray gun 12, such as by flattening or widening the fluid spray fan. Upstream fluid pressure can drive the spray fluid through the spray gun 12 and spray tip 20 at sufficient pressure to cause the atomization. As such, the atomized fluid spray can be generated airlessly while the shaping air emitted through air cap 22 assists in shaping the resulting spray pattern.

Air cap 22 is at least partially disposed within air cap housing 24. Air cap housing 24 is connected to gun body 16, such as by interfaced threading, among other options, and secures air cap 22 to gun body 16. Spray tip 20 is at least partially disposed within air cap 22 and is configured to emit the fluid spray. Spray tip 20 can include a spray nozzle 30 (shown in FIG. 3A) that atomizes the spray fluid. The spray nozzle 30 can shape the fluid spray. Spray gun 12 is configured to emit the fluid spray along spray axis A-A. The fluid spray is emitted in a pattern that is shaped by the shaping air. For example, the spray pattern can be a fan that is elongate orthogonal to spray axis A-A. Air horns 26 extend generally axially from the body of air cap 22. Air horns 26 are disposed on opposite lateral sides of spray tip 20.

Indicia 28 provide an indicator for the orientation of spray tip 20. Indicia 28 provide a visual indication of the orientation of spray tip 20, which orientation is formed relative to the long axis of the spray fan generated by spray tip 20. In the example shown, an array of marks is disposed around axis A-A to form indicia 28. In some examples, indicia 28 can include additional indicators, such as letters or numbers, to provide additional orientation information to the user. In the example shown, gun body 16 includes indicia 28. It is understood, however, that indicia 28 can additionally or alternatively be located on any desired portion of spray gun 10 suitable for orienting spray tip 20 relative to, such as, for example, on air cap housing 24, among other options.

Figure 3A:
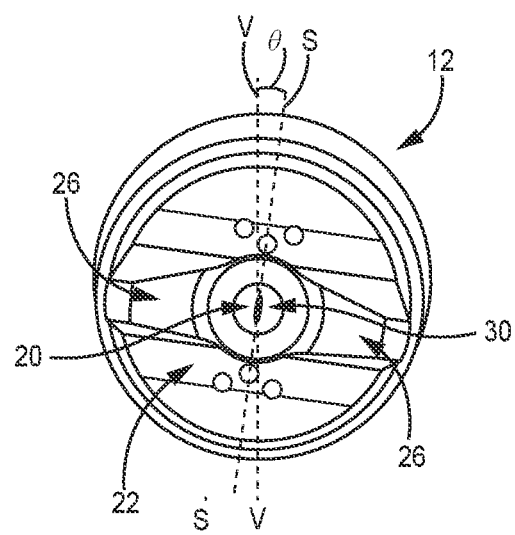
FIG. 3A is a front elevation view of a spray tip of the air assisted airless spray gun of FIG. 2.
Figure 3B:
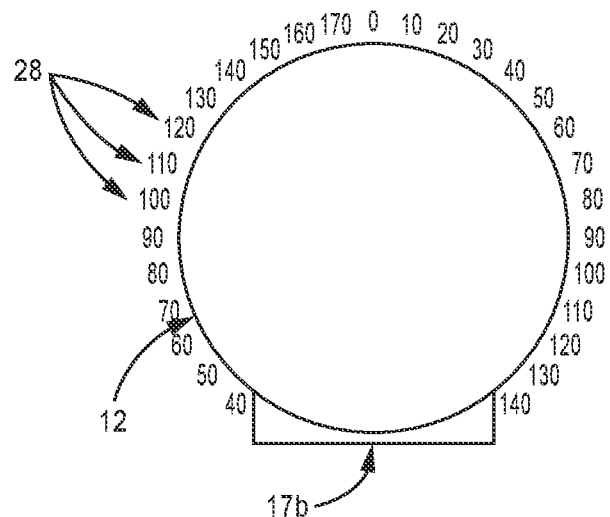
FIG. 3B is a schematic depiction of a series of indicia on a gun body of the air assisted airless spray gun of FIG. 2.

FIG. 3A is a front elevational view of air cap assembly 18. FIG. 3B is a schematic depiction of indicia 28 arranged about the circumference of spray gun 12. FIGS. 3A and 3B will be discussed together. Indicia 28 are configured to indicate an angular position of air cap 22 relative to spray gun 12. Indicia 28 can be formed on gun body 16 and/or air cap housing 24, among other locations on spray gun 12. In the example shown, indicia 28 includes a series of tick marks arranged at least partially about the circumference of gun body 16. Indicia 28 include angular indicators to provide the user a visual indication of the angular offset of the air cap 22.

Air cap housing 24 is connected to gun body 16 to secure air cap 22 to gun body 16. Air horns 26 extend axially with respect to air cap 22. Each air horn 26 is spaced radially from spray tip 20. Air cap housing 24 can extend over air cap 22 and is connected to gun body 16, thereby securing air cap 22 to gun body 16. Air cap 22 is rotatably connected to gun body 16 such that air cap 22 can be rotated about spray axis A-A and relative to gun body 16 while mounted to gun body 16 to change an orientation of spray nozzle 30. The orientation of spray nozzle 30 controls the orientation of the long portion of the spray fan. Air cap 22 and spray tip 20 may need to be removed from spray gun 12 in order to be cleaned, serviced, replaced, or otherwise undergo maintenance. For example, air cap housing 24 can be removed from gun body 16 and then air cap 22 and spray tip 20 can be removed. Air cap 22 and spray tip 20 are repositioned on spray gun 12 and secured on gun body 16 by air cap housing 24. However, spray nozzle 30 is typically misoriented relative to the desired spray orientation after spray gun 12 is reassembled. As such, the orientation of air cap 22, and thus of spray tip 20 and spray nozzle 30, requires adjustment to a desired spray orientation.

Spray tip 20 extends through air cap 22 and is configured to atomize a spray fluid such as paint, stain, or lacquer, among other options. Spray nozzle 30 is formed through spray tip 20 and is configured to emit the fluid. Spray tip 20 can spray in a fan-shaped spray pattern which can create a roughly oval spray pattern on a sprayed surface. For example, spray nozzle 30 can be of a cat-eye or other shaped aperture that emits an elongate spray fan. By rotating air cap 22, a range of fan orientations are possible for the spray pattern. Air cap 22 emits the shaping air while spray tip 20 emits the spray fluid.

Indicia 28 are configured to indicate the fan orientation of spray tip 20, where the fan orientation of spray tip 20 is defined by angular offset θ of air cap 22 relative to vertical plane V-V. Vertical plane V-V is oriented orthogonal to spray axis A-A, and angular offset θ can be in a clockwise or counterclockwise circumferential direction from vertical plane V-V. Vertical plane V-V defines a neutral position of air cap 22 such that when air cap 22 is in the neutral position, the fan orientation of spray tip 20 is oriented along vertical plane V-V. In the example shown, angular offset θ is set to 0 degrees when air cap 22 is in the neutral position such that the spray plane S-S and vertical plane V-V are co-planar. As discussed in more detail below, alignment tool 14 (best seen in FIGS. 4A-4C) is utilized to rotate air cap 22, and thus spray tip 20, about spray axis A-A to orient spray orifice 30 to a desired position. The starting position of air cap 22 can be, for example, the position air cap 22 is in following connection to gun body 16. Air cap 22 is rotated from the starting position to a desired spray position by the alignment tool 14 such that the angular offset θ is formed between the neutral and desired spray positions. With air cap 22 in the spray position, spray tip 20 is oriented to emit material along spray plane S-S.

It is understood that spray plane S-S in FIG. 3A is shown by way of example and that the desired spray plane S-S during operation can be of any desired orientation about spray axis A-A, including aligned with vertical plane V-V or offset from vertical plane V-V by any desired angular value. The spray fan plane S-S can be rotationally mirrorable about spray axis A-A. In such an example, rotating air cap 22, and thus spray tip 18, clockwise by a first angular offset relative to the vertical plane V-V results in the same spray pattern as rotating air cap 22 counterclockwise by a second angular offset relative to the vertical plane V-V, where the first and second angular offsets sum to 180-degrees. For example, rotating air cap 22 35-degrees clockwise results in the same spray fan as rotating air cap 22 145-degrees counterclockwise. Indicia 28 can also be rotationally mirrored to facilitate rotating air cap 22 in either rotational direction to align spray tip 20. Indicia 28 thereby facilitate quick and easy alignment of air cap 22 with less than a half turn in either rotational direction to align spray tip 20 for spraying.

Figure 4A:
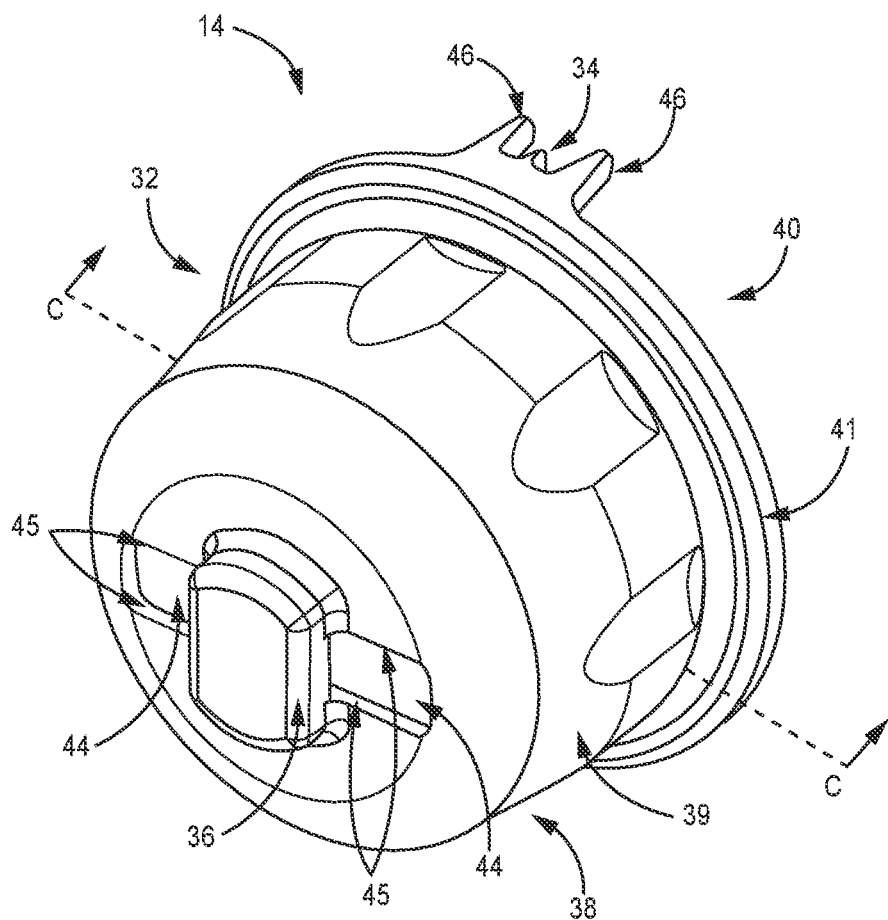
FIG. 4A is a top view of an alignment tool.
Figure 4B:
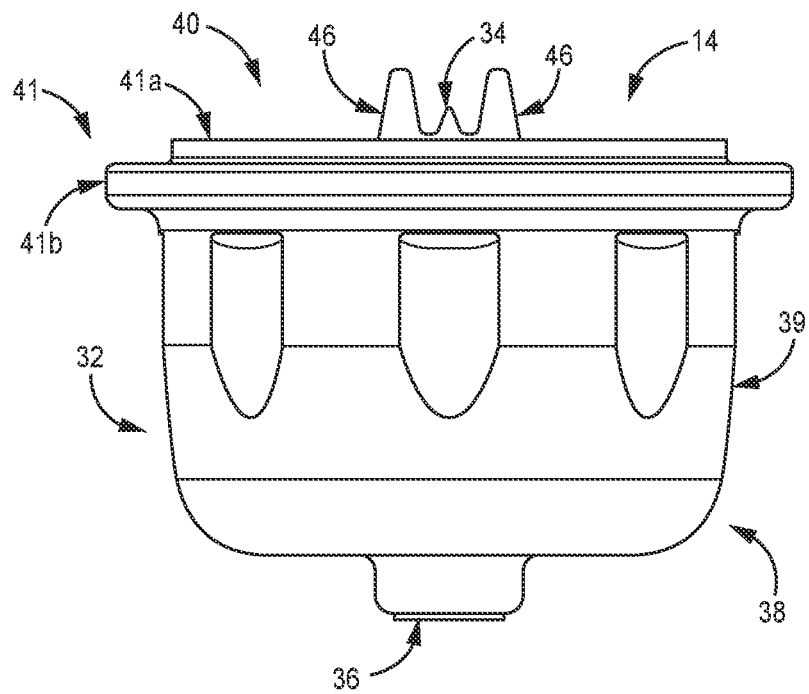
FIG. 4B is a front elevation view of the alignment tool of FIG. 4A.
Figure 4C:
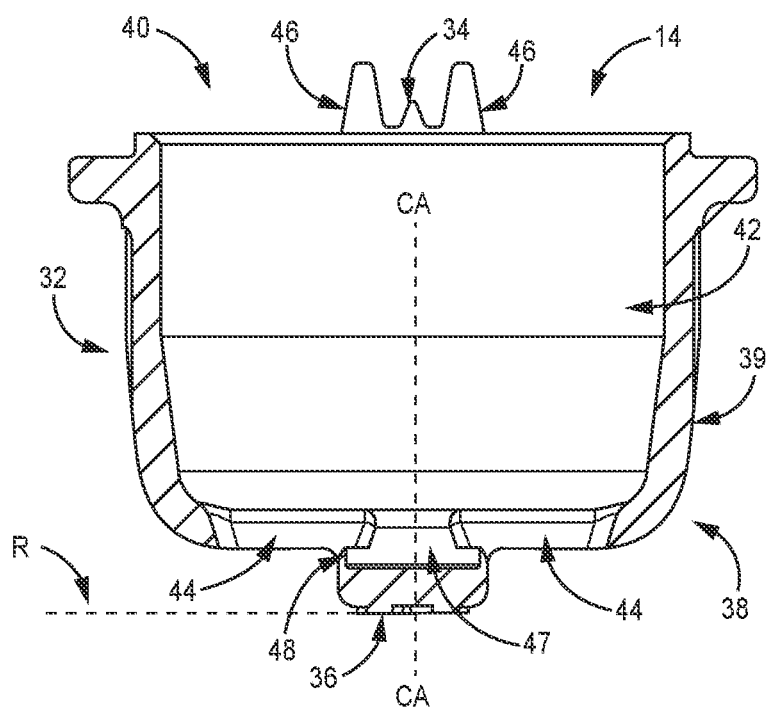
FIG. 4C is a cross-sectional view of the alignment tool taken along line C-C in FIG. 4A.

FIG. 4A is an isometric view of alignment tool 14. FIG. 4B is a top plan view of alignment tool 14. FIG. 4C is a cross-sectional view of alignment tool 14 taken along line C-C in FIG. 4A. FIGS. 4A-4C will be discussed together. Alignment tool 14 includes tool body 32, indicator 34, and projection 36. Tool body 32 includes closed end 38, side wall 39, and open end 40.

Tool body 32 extends between a first end and a second end. In the example shown, the first end is closed end 38 and the second end is open end 40. It is understood, however, that the first end of tool body 32 and the second end of tool body 32 can be formed in any desired manner. In the example shown, alignment tool 14 is a cylindrical component, and tool body 32 includes an approximately circular circumferential side wall 39 between closed end 38 and open end 40. Side wall 39 can narrow towards closed end 38. Side wall 39 can include crenulations and/or other features, such as a knurled, grooved, or otherwise contoured surface, to facilitate gripping of alignment tool 14. Tool body 32 includes annular edge 41 defining the opening of open end 40. In the example shown, annular edge 41 contains radial flange 41a and axial flange 41b. Tool body 32 defines chamber 42 that is configured to receive at least a portion of air cap assembly 18 during alignment of the spray tip 22. Alignment tool 14 can be additively manufactured and can be, for example, formed of a material such as nylon which does not chemically interact with fluids such as paint or solvents.

Alignment tool 14 includes horn receiving openings 44 formed in closed end 38. Each horn receiving opening 44 is at least partially defined by engagement surfaces 45 and is able to receive an air horn 26. Each air horn 26 can extend at least partially through a corresponding horn receiving opening 44 when alignment tool 14 is mounted on air cap housing 24. When air horn 26 extends through horn receiving opening 44, the engagement surfaces 45 are disposed adjacent to circumferential sides of air horns 26, as best seen in FIGS. 5A-6B. Engagement surfaces 45 are configured to directly contact air horns 26 and exert a rotational force on air horns 26 to rotate air cap 22 about spray axis A-A. The air horns 26 extend through the horn receiving openings 44 through closed end 38. In the example shown, horn receiving openings 44 extend through the closed end 38 such that horn receiving openings 44 are enclosed openings. As such, horn receiving openings 44 are axially open to allow air horns 26 to extend through openings 44, but horn receiving openings 44 are closed on the radial/circumferential sides.

Indicator 34 is an axial projection of alignment tool 14 and can contain a pointed tip which extends axially from radial flange 41a of annular edge 41 adjacent to open end 40. Indicator 34 extends axially beyond open end 40 and away from closed end 38. In the example shown, alignment tool 14 also includes indicator guards 46 on either circumferential side of indicator 34. In the example depicted, indicator guards 46 are axial projections which extend from radial flange 41a of annular edge 41. Indicator 34 and each indicator guard 46 have a respective axial length that is defined by the axial distance from radial flange 41a to the distal end of each axial projection away from radial flange 41a. Indicator guards 46 have a larger axial length than indicator 34. Indicator guards 46 are configured to protect indicator 34 from damage. For example, if alignment tool 14 is dropped, indicator guards 46 will contact any surface prior to indicator 34 contacting the surface, preventing undesired contact damage that could cause a deformation to indicator 34.

Projection 36 extends from closed end 38 of alignment tool 14. Projection 36 extends axially away from closed end 38 and can be disposed between horn receiving openings 42. Projection 36 can be bracketed by horn receiving openings 44. In the example shown, projection 36 defines a blocking chamber 47 that is axially aligned with spray orifice 30 of air cap assembly 18 when alignment tool 14 is mounted to spray gun 12. Blocking chamber 47 is spaced from spray orifice 30 when alignment tool 14 is mounted to spray gun 12. Projection 36 and blocking chamber 47 protect the user from a discharge of paint or other material if spray gun 12 is triggered while alignment tool 14 is mounted on air cap 22. In the embodiment shown, projection 36 includes projection openings 48 that extend at least partially along the side walls of projection 36 that are adjacent horn receiving openings 44. The projection openings 48 and horn receiving opening 44 together define the horn receiving apertures through which air horns 26 extend. In the example shown, projection openings 48 and horn receiving openings 44 are defined by a contiguous removal of material such that a single aperture defines both a horn receiving opening 44 and an adjacent projection opening 48. Projection openings 48 extend axially relative to radial line R projecting relative a center axis CA of alignment tool 14. The center axis CA can be configured to be aligned with the spray axis A-A when alignment tool 14 is mounted to spray gun 12. The projection opening 48 extends axially between an intersection with horn receiving opening 44 and the opposite end of the projection opening 48. In the example shown, projection openings 48 extend both axially and radially. In the event that spray gun 12 is triggered while alignment tool 14 is mounted, the resulting spray enters blocking chamber 47 and is emitted through projection openings 48. The output pressure is dissipated to prevent injection or other injuries from occurring.

Figure 5A:
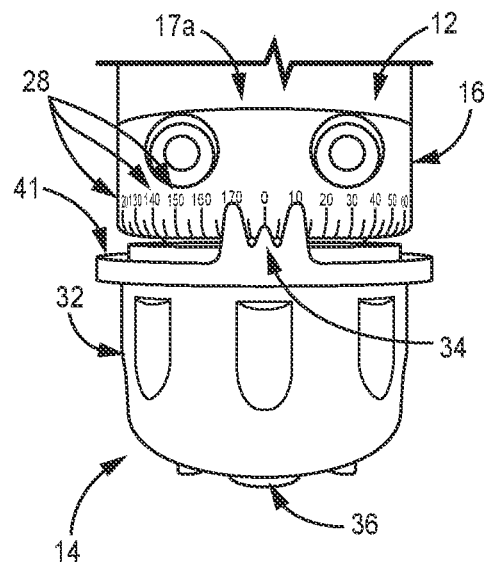
FIG. 5A is a top plan view showing an alignment tool mounted to an air assisted airless spray gun with an air cap of the air assisted airless spray gun oriented in a starting position.
Figure 5B:
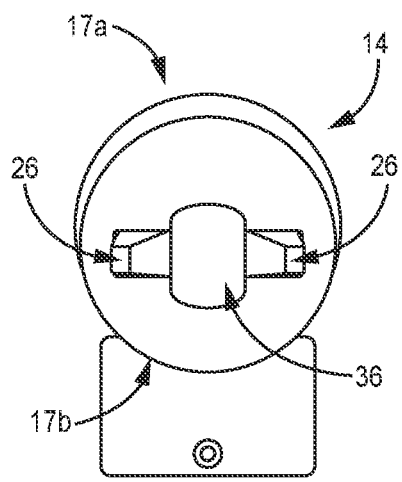
FIG. 5B is a front elevation view showing the alignment tool mounted to the air assisted airless spray gun with the air cap in the starting position of FIG. 5A.
Figure 6A:
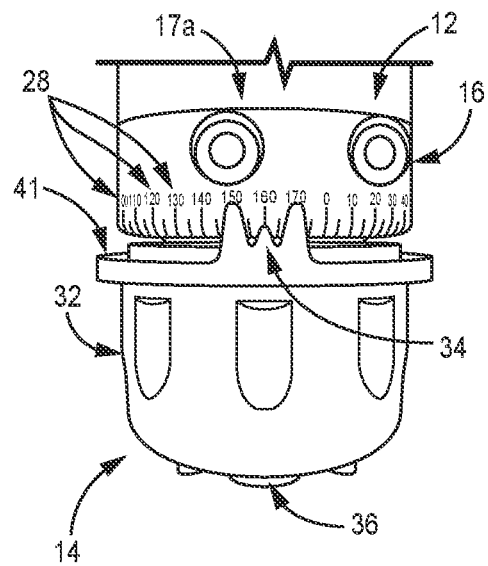
FIG. 6A is a top plan view of the alignment tool mounted to the air assisted airless spray gun of FIG. 5A with the air cap adjusted to a desired spray position.
Figure 6B:
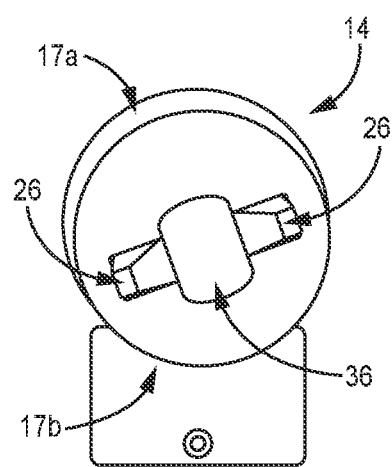
FIG. 6B is a front elevation view of the airless air assisted spray gun with the alignment tool mounted to the spray gun and with the air cap in the desired spray position of FIG. 6A.

FIG. 5A is a top plan view showing alignment tool 14 mounted to air cap assembly 18 with air cap 22 in a starting position. FIG. 5B is a front elevation view showing alignment tool 14 mounted to air cap assembly 18 with air cap 22 in the starting position. FIG. 6A is a plan view showing alignment tool 14 mounted to air cap assembly 18 with air cap 22 in a desired spray position. FIG. 6B is a front elevation view showing alignment tool 14 mounted to air cap assembly 18 with air cap 22 in the desired spray position. FIGS. 5A-6B will be discussed together. Gun body 16 and indicia 28 are shown. Tool body 32, indicator 34, projection 36, horn receiving openings 44, and engagement surfaces 45 of alignment tool 14 are shown. Air horns 26 of air cap 22 are shown.

Alignment tool 14 is configured to adjust the orientation of air cap 22, and thus the orientation of the spray plane S-S of the spray orifice 30 (shown in FIG. 3A) about the spray axis A-A. Air cap 22 and spray tip 20 may need to be removed from spray gun 12 in order to be cleaned, serviced, replaced, or otherwise undergo maintenance. This maintenance allows a new air cap 22 to be connected to spray gun 12. It should be noted that the "new" air cap is so named to differentiate it from the air cap in the state in which it is removed from the spray gun. The new air cap can be, for example, a previously unused air cap, a refurbished air cap, or the original air cap which has been cleaned, been refurbished, or otherwise undergone maintenance. Once air cap 22 is connected to spray gun 12, spray tip 20 is in a starting position. Alignment tool 14 can then be mounted to spray gun 12 to align spray tip 20 to a desired spray position.

During use of alignment tool 14, alignment tool 14 is mounted to spray gun 12 to directly interface with air cap 22. Alignment tool 14 can, in some examples, fully enclose and cover air cap 22. For example, alignment tool 14 can include enclosed projections for receiving air horns 26. In the example shown, alignment tool 14 partially encloses air cap 22 with air horns 26 extending through horn receiving openings 44. Alignment tool 14 can mount to air cap housing 24 of spray gun 12 as shown in FIGS. 5A-6B. In some embodiments, alignment tool 14 can be removably mounted to air cap housing 24, while in other embodiments alignment tool 14 can be integrated with air cap housing 24. Alignment tool 14 can be used during the alignment of spray tip 20, after spray tip 20 and air cap 22 have been attached to spray gun 12.

Alignment tool 14 is configured to engage air cap 22 and reposition spray tip 20 at any desired angle by rotating air cap 22 about spray axis A-A. In the example shown, alignment tool 14 interfaces with air horns 26 to engage with air cap 22. The interface between alignment tool 14 and air cap 22 can be achieved by direct or indirect contact between alignment tool 14 and air horns 26. Tool body 32 of alignment tool 14 can cover and receive air cap 22. In the example shown, alignment tool 14 receives air cap housing 24 within chamber 42 of alignment tool 14. The rotation of alignment tool 14, and the resulting torque exerted on air cap 22 to cause rotation of air cap 22, can occur in either a clockwise or counterclockwise circumferential direction with respect to spray axis A-A. After this rotation, spray tip 20 is oriented in a desired spray position, and during use of spray gun 12 the fan orientation of the spray fluid will correspond to the desired spray position of spray tip 20. The angular offset θ achieved by this rotation is indicated by indicia 28. In the example depicted in FIGS. 6A-6B, the alignment tool has been rotated in a counterclockwise circumferential direction.

The user can visually confirm the orientation of air cap 22 based on the position of indicator 34 relative to indicia 28. In the example shown, indicia 28 include numerals indicating the angular offset from vertical plane V-V, which vertical plane is indicated by the "0" or neutral one of indicia 28. The user rotates alignment tool 14 until indicator 34 is aligned with the indicia 28 associated with the desired spray orientation. The air cap 22 and spray tip 20 are thus placed in the rotational positions associated with the desired spray position. Spray tip 20 is thereby aligned to emit the spray pattern at the desired orientation.

In the example shown, alignment tool 14 is removably mounted to spray gun 12, and can be removed from spray gun 12 after spray tip 20 is oriented at the desired spray position. It is understood, however, that alignment tool 14 can interface with spray gun 12 in any desired manner suitable for quickly and efficiently manipulating an angular orientation of the air cap 22 to a precise, desired angular orientation. For example, the interface can include one or more of a click knob, a spring-loaded connection, clocked threads on a retaining ring of air cap housing 24, or another desired interface. In some examples, alignment tool 14 can be integrated with spray gun 12. This can be achieved by incorporating indicia onto air cap housing 24 and including indicating features on a non-removable part, incorporating the indicating features onto air cap assembly 18 or a retaining ring, or other locations on spray gun 12.

Alignment tool 14 provides significant advantages. Alignment tool 14 engages with air cap 22 to exert torque on air cap 22 and alter the angular position of air cap 22. Alignment tool 14 further provides a visual indication of the angular position. Alignment tool 14 thereby facilitates quick and easy alignment of spray tip 20 into a desired position for spraying. Air cap 22 does not need to be adjusted multiple times through a trial and error process and can instead be aligned quickly and efficiently by alignment tool 14. Alignment tool 14 thereby reduces downtime, increases operational efficiency, and reduces costs and material waste. Alignment tool 14 can additionally prevent user injuries by blocking fluid spray while alignment tool 14 is mounted on spray gun 12.

Figure 7:
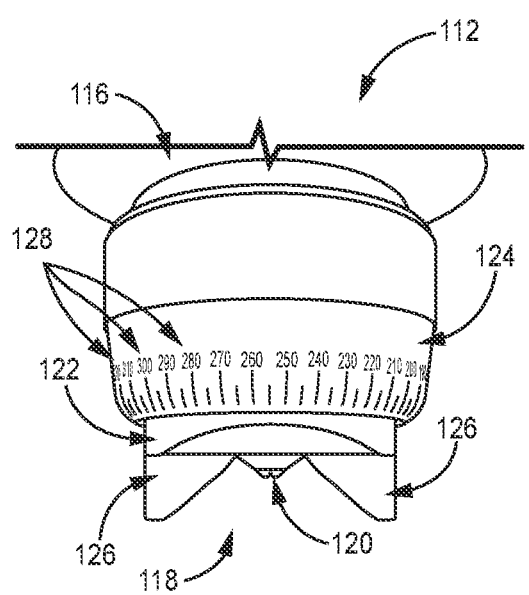
FIG. 7 is an isometric view of another embodiment of an air cap of an air assisted airless spray gun.

FIG. 7 is a top elevation view of air cap assembly 118 of spray gun 112. Spray gun 112 includes gun body 116 and air cap assembly 118. Air cap assembly 118 includes spray tip 120, air cap 122, and air cap housing 124. In the example shown, air cap 122 includes air horns 126. Air cap housing 124 can secure air cap 122 to gun body 116.

Spray gun 112 is substantially similar to spray gun 12, differing primarily in the location of indicia 128, which are substantially similar to indicia 28. Air cap housing 124 of spray gun 112 includes indicia 128. Indicia 128 are configured to indicate an angular position of air cap 122 relative to gun body 116. In the example shown, indicia 128 includes a series of tick marks arranged at least partially about the circumference of air cap housing 124. As in the embodiment described in FIGS. 2-3, indicia 128 include angular indicators to provide the user a visual indication of the angular offset of air cap 122. An alignment tool, such as alignment tool 14 described above (best seen in FIGS. 4A-4C) can be configured to engage air horns 126 and have an indicator 34 interfacing with indicia 128. The alignment tool can extend only partially axially such that the alignment tool axially overlaps with up to a portion of air cap housing 124. The use of an alignment tool with spray gun 112 provides substantially the same advantages as described above.

While the invention has been described with reference to an exemplary embodiment(s), it will be understood by those skilled in the art that various changes may be made and equivalents may be substituted for elements thereof without departing from the scope of the invention. The particular offsets and ratios illustrated and described herein are offered only by way of example, not limitation. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An alignment tool for adjusting an orientation of a spray pattern emitted by a spray gun, the alignment tool comprising:
   a tool body extending between a first end and a second end;
   a first engagement surface disposed at the first end, the first engagement surface at least partially defining a first opening configured to receive a first air horn of an air cap of the spray gun; and
   a second engagement surface disposed at the first end, the second engagement surface at least partially defining a second opening configured to receive a second air horn of the air cap;
   wherein the first engagement surface is configured to interface with the first air horn and the second engagement surface is configured to interface with the second air horn to exert a rotational force on the air cap about a spray axis through the air cap; and
   wherein:
      the tool body of the alignment tool extends between an open end and a closed end;
      the open end is the second end and the closed end is the first end; and
      the first opening is formed through the closed end and the second opening is formed through the closed end such that the first end is centrally closed between the first opening and the second opening.

2. The alignment tool of claim 1, further comprising:
   an indicator disposed on the tool body, the indicator configured to indicate an angular position of the air cap relative to the spray axis.

3. The alignment tool of claim 2, wherein the indicator comprises a pointed tip extending from an edge of the alignment tool.

4. The alignment tool of claim 2, wherein the indicator comprises:
   a first axial projection extending a first axial distance from an annular edge of the alignment tool;
   a second axial projection extending a second axial distance from the annular edge; and
   a third axial projection extending a second axial distance from the annular edge;
   wherein the first axial distance is smaller than the second axial distance and the third axial distance; and
   wherein the first axial projection is disposed circumferentially between the second axial projection and the third axial projection.

5. The alignment tool of claim 1, wherein the alignment tool further comprises:
   a projection extending from the closed end of the alignment tool, the projection disposed between the first opening and the second opening, extending in a first axial direction away from the closed end, and defining a blocking chamber which is axially aligned with the spray axis.

6. The alignment tool of claim 1, wherein the first opening is formed through the closed end such that the first opening is an enclosed opening and the second opening is formed through the closed end such that the second opening is an enclosed opening.

7. The alignment tool of claim 6, wherein:
   the first opening is defined by a plurality of the first engagement surfaces;
   the second opening is defined by a plurality of the second engagement surfaces;
   a lower one of the plurality of the first surfaces is configured to interface with a first circumferential side of the first air horn;
   an upper one of the plurality of the first surfaces is configured to interface with a second circumferential side of the first air horn;
   a lower one of the plurality of the second surfaces is configured to interface with a first circumferential side of the second air horn; and
   an upper one of the plurality of the second surfaces is configured to interface with a second circumferential side of the second air horn.

8. An alignment system comprising:
   a spray gun configured to generate a fluid spray, the spray gun comprising:
      a gun body;
      an air cap assembly mounted to the gun body, the air cap assembly configured to emit a fluid spray fan from a spray orifice and at a fan orientation, wherein the air cap assembly comprises:
         an air cap having a first air horn extending axially from the air cap and spaced radially from the spray orifice and a second air horn extending axially from the air cap and spaced radially from the spray orifice; and
         an air cap housing connected to the gun body to secure the air cap to the gun body; and
   the alignment tool of claim 1, wherein the alignment tool is configured to extend over the air cap and engage with the first air horn and the second air horn to exert a rotational force on the air cap by the engagement between the alignment tool and the first air horn and second air horn to alter an angular position of the air cap and thereby alter the fan orientation.

9. The alignment system of claim 8, wherein:
   the spray gun includes a series of indicia formed on one of the gun body and the air cap housing; and
   the alignment tool includes an indicator configured to interface with the series of indicia to indicate the angular position of the air cap about the gun axis.

10. The alignment system of claim 9, wherein the series of indicia are formed by a plurality of tick marks formed on a gun body of the spray gun and arranged about a circumference of the air cap housing.

11. The alignment system of claim 8, wherein the alignment tool is configured to mount to the air cap housing of the spray gun and the air cap housing is configured to secure the air cap to the spray gun.

12. The alignment system of claim 11, wherein the alignment tool is removably mountable to the air cap housing.

13. The alignment system of claim 8, wherein the first air horn extends at least partially through the first opening and the second air horn extends at least partially through the second opening.

14. The alignment system of claim 8, wherein the spray gun is an air assisted airless spray gun.

\* \* \* \* \*